(12) United States Patent
Holt et al.

(10) Patent No.: US 7,953,983 B2
(45) Date of Patent: May 31, 2011

(54) IMAGE OR PICTOGRAPHIC BASED COMPUTER LOGIN SYSTEMS AND METHODS

(75) Inventors: Erik L Holt, Redmond, WA (US); Matthew E Kowalczyk, Seattle, WA (US); Russell Humphries, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1170 days.

(21) Appl. No.: 11/073,742

(22) Filed: Mar. 8, 2005

(65) Prior Publication Data

US 2006/0206717 A1     Sep. 14, 2006

(51) Int. Cl.
*G06F 21/00* (2006.01)

(52) U.S. Cl. ........................................ 713/186; 713/182

(58) Field of Classification Search .................. 713/170, 713/176, 182–186; 382/115, 181, 203, 119, 382/123; 726/21, 16–20, 27–30, 2, 3
See application file for complete search history.

(56) References Cited

U.S. PATENT DOCUMENTS

| | | | | |
|---|---|---|---|---|
| 5,559,961 A | * | 9/1996 | Blonder | 726/18 |
| 6,958,759 B2 | * | 10/2005 | Safadi et al. | 345/660 |
| 2004/0010722 A1 | * | 1/2004 | Ha | 713/202 |
| 2004/0034801 A1 | * | 2/2004 | Jaeger | 713/202 |
| 2004/0260955 A1 | * | 12/2004 | Mantyla | 713/202 |

FOREIGN PATENT DOCUMENTS

DE     10024179 A1  *  5/2000

OTHER PUBLICATIONS

Ian Jermyn, Alain May, Fabian Monrose, Michael Riter, Avi Rubin, "The Design and Analysis of Graphical Passwords", Aug. 1999, Proceedings of the 8th USENIX Security Symposium, pp. 1-15.*

* cited by examiner

*Primary Examiner* — Edward Zee
(74) *Attorney, Agent, or Firm* — Woodcock Washburn LLP

(57) ABSTRACT

Image based login procedures for computer systems include: (a) displaying a first image on a computer screen; (b) receiving user input indicating a portion of the first image; (c) determining if the user input corresponds to a first acceptable user input for user authentication; and (d) proceeding with the authentication procedure when this user input corresponds to the first acceptable user input for user authentication. Additionally or optionally, when proceeding with this authentication procedure, the systems and methods further may include: displaying a second image on the screen; receiving new user input indicating a portion of the second image; and determining if this new input corresponds to a second acceptable user input for user authentication.

14 Claims, 5 Drawing Sheets

IMAGE OR PICTOGRAPHIC BASED COMPUTER LOGIN SYSTEMS AND METHODS

FIELD OF THE INVENTION

The present invention generally relates to systems, methods, and computer-readable media for providing an image or pictographic based login procedure for computer systems or networks. While useful in non-electronic ink environments, such systems and methods may find particular usefulness in login procedures for pen-based computing systems and/or other systems that accept electronic ink input.

BACKGROUND

Typical computer systems, especially computer systems using graphical user interfaces ("GUIs"), are optimized for accepting user input from one or more discrete input devices, such as a keyboard for entering text and a pointing device, such as a mouse with one or more buttons, for operating the user interface. An example of such a GUI is the user interface for the Windows® computer operating system (available from Microsoft Corporation of Redmond, Wash.). The ubiquitous keyboard and mouse interface provides for fast creation and modification of documents, spreadsheets, database fields, drawings, photos, web pages, emails, and the like.

Recently, however, pen-based computing systems, such as tablet personal computers ("tablet PCs"), personal digital assistants ("PDAs"), and the like, have been increasing in popularity. With pen-based computing systems, user input advantageously may be introduced as "electronic ink" using an electronic "pen" or stylus (e.g., mimicking writing with a pen or pencil on a piece of paper). Indeed, in at least some pen-based computing systems, all user input is capable of being entered and manipulated using an electronic pen input device, and the user interface is fully controllable using only the electronic pen.

As pen-based computing systems become more popular, many computer activities such as access in a computer system become more difficult to implement. For example, in a computer system in which a user logs into an individualized account or inputs security information to enter a restricted site, a pen-based computer system creates difficulties for the user to conveniently and efficiently maneuver the pen or stylus to accomplish the task.

In a typical computer system, a display is presented to the user containing a field in which the user enters a userid and a field in which the user enters a corresponding password. Typically, a user inputs information via a keyboard. Therefore, if inputting data via a keyboard is problematic (e.g., a keyboard is not available or not conveniently accessible), a user may not be able to input data as necessary. In such a system lacking a conveniently available keyboard, a user would be unable to successfully access information because of the inability to enter authentication information into the system.

In the traditional method of gaining access to a private account, a user typically enters a password via a keyboard. A password that has a higher level of security (i.e., a completely random string of characters that is not otherwise associated with the user) is typically difficult to remember. Thus, the user often forgets the password and must expend effort in having the password reset, obtaining the password from a system administrator, etc. To avoid this inconvenience, the user may select a password that is easy to remember, such as the user's date of birth. However, such passwords are easy to "crack" and provide very little security to the user. This defeats the purpose of having the security system in the first place. Thus, the typical computer user is caught in a dilemma of trying to maintain a high level of security while at the same time creating a password that the user can remember. Often, this balance is difficult to achieve. Therefore, a system and method for providing security is needed that is easy to use for the user with minimal demands on the user's memory while providing a high level of security against unauthorized users.

The above-noted issues associated with data input of security information, compromise of password security information or loss of security in computing systems can lead to user frustration. Accordingly, there is a need in the art for improved input of security information, e.g., for use with pen-based computing systems and in other situations where keyboards are inconvenient or unavailable.

SUMMARY

Aspects of the present invention relate to systems, methods, and computer-readable media for providing image or pictographic based login procedures for computer systems or networks. Such systems and methods may include: (a) displaying a first image on a computer display screen; (b) receiving a first user input indicating a portion of the first image (e.g., via an electronic ink input system); (c) determining if the first user input corresponds to a first acceptable user input for user authentication (e.g., via a computer processor system); and (d) proceeding with a user authentication procedure when the first user input corresponds to the first acceptable user input for user authentication. Additionally or optionally, when proceeding with the user authentication procedure, systems and methods in accordance with examples of this invention may further include: displaying a second image on the computer display screen; receiving a second user input indicating a portion of the second image; and determining if the second user input corresponds to a second acceptable user input for authentication. If desired, user access to the computer system or network may be allowed when the first and/or second user inputs correspond to the acceptable user inputs for user authentication. Aspects of the invention further relate to computer-readable media including computer-executable instructions stored thereon for providing image or pictographic based authentication procedures for computer systems or networks like those described above.

BRIEF DESCRIPTION OF THE DRAWINGS

The above and other objects, features, and advantages of the present invention will be more readily apparent and more fully understood from the following detailed description, taken in conjunction with the appended drawings, in which.

When the same reference number is used in more than one of the attached drawings, it is intended to refer to the same or similar parts, features, or steps in the various different drawings.

DETAILED DESCRIPTION

Figure 1:
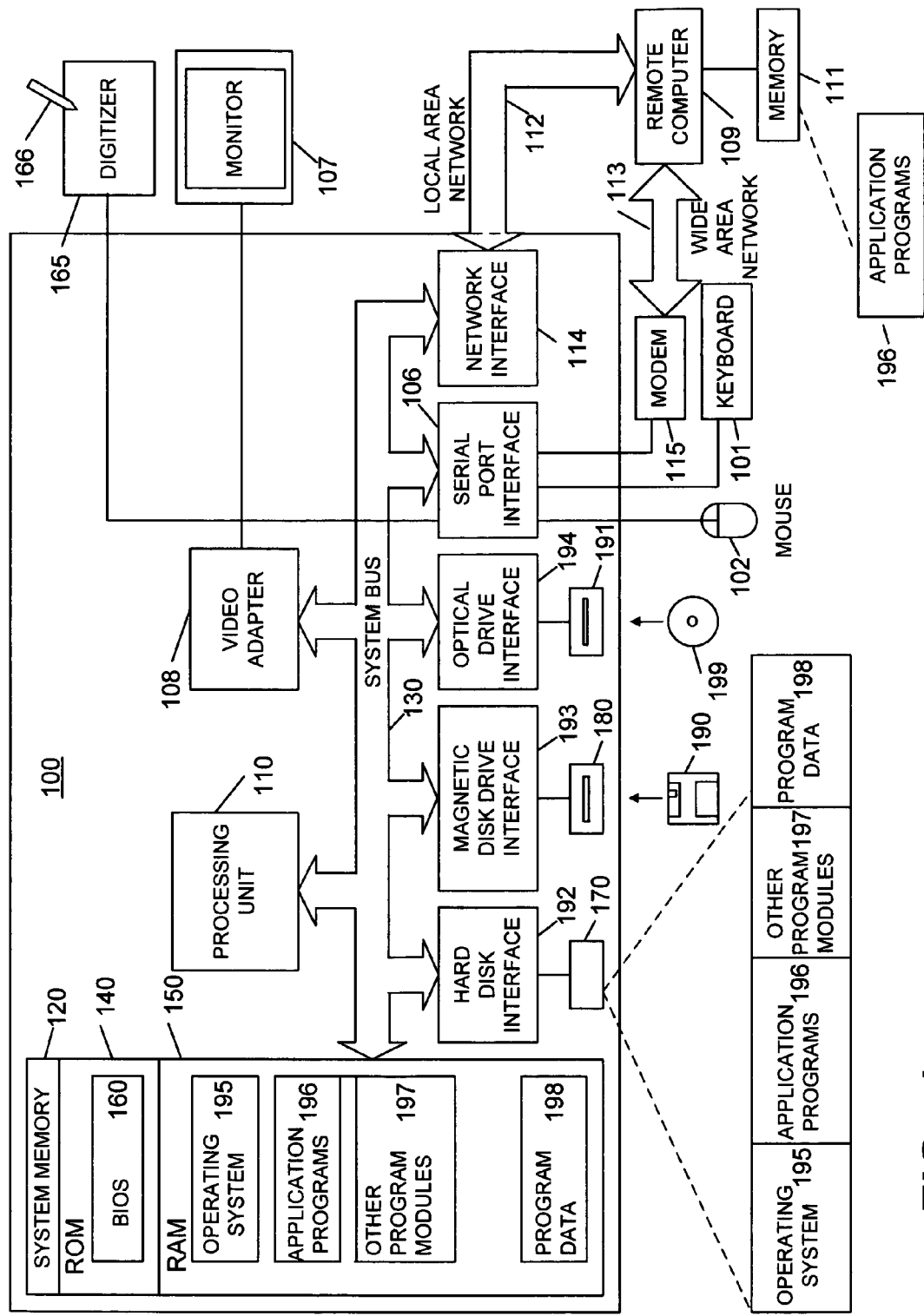
FIG. 1 illustrates a schematic diagram of an example general-purpose digital computing environment in which at least some aspects of the present invention may be implemented.

As described above, aspects of the present invention relate to systems, methods, and computer-readable media for an image or pictographic login procedure. The following description is divided into sub-sections to assist the reader. The sub-sections include: Terms; General Description of Various Aspects of the Invention; Example Hardware; Example Systems, Methods, and Computer-Readable Media According to the Invention; and Conclusion.

I. Terms

The following terms are used in this specification and, unless otherwise specified or clear from the context, the terms have the meanings provided below:

"Pen"—Any type of user input device useful in entering electronic ink into and/or otherwise manipulating or controlling an electronic document, a user interface, and/or a computer operating system. The terms "pen" and "stylus" may be used interchangeably in this specification.

"Computer-Readable Medium" means any available media that can be accessed by a user on a computer system. By way of example, and not limitation, "computer-readable media" may include computer storage media and communication media. "Computer storage media" includes volatile and nonvolatile, removable and non-removable media implemented in any method or technology for storage of information, such as computer-readable instructions, data structures, program modules or other data. "Computer storage media" includes, but is not limited to, RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. "Communication media" typically embodies computer-readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of "computer-readable media."

II. General Description of Various Aspects of the Invention

As generally described above, aspects of the present invention relate to systems, methods, and computer-readable media for providing an image or pictographic based authentication procedure for computer systems or networks. The authentication procedure of the present invention may be applied in any application where authorization of a user is desired. For example, a system may require authentication of a user before allowing the user to "log in" to the user's account. In this situation, a user desiring access to his personal account on a system may apply the authentication procedure of the present invention to gain access to the account while preventing other unauthorized users from accessing the account. Also, the authentication procedure of the present invention may be applied to accessing protected or private sites, for example, on an intranet or on the internet and/or for accessing or logging on to individual computers or systems, local area networks, wide area networks, or the like. Methods in accordance with at least some examples of this invention may include: (a) displaying a first image on a computer display screen; (b) receiving a first user input indicating a portion of the first image; (c) determining if the first user input corresponds to a first acceptable login user input; and (d) proceeding with a user login procedure when the first user input corresponds to the first acceptable login user input. Additionally or optionally, when proceeding with the user login procedure, methods in accordance with at least some examples of this invention further may include: displaying a second image on the computer display screen (the second image may be the same as the first image, an enlargement of part of the first image, a completely new image, etc.); receiving a second user input indicating a portion of the second image; and determining if the second user input corresponds to a second acceptable login user input. If desired, user access to the computer system or network may be allowed when the first and/or second user inputs correspond to the acceptable login user inputs.

Systems in accordance with at least some examples of this invention may include: (a) a computer display screen; (b) an input system for receiving user input (e.g., such as a digitizer for receiving electronic ink input); and (c) a processor system (e.g., including one or more processors) programmed and adapted to: (i) display a first image on a computer display screen, (ii) determine if a first user input indicating a portion of the first image corresponds to a first acceptable login user input, and (iii) proceed with a user login procedure when the first user input corresponds to the first acceptable login user input. In at least some examples of systems in accordance with this invention, when the system proceeds with the user login procedure, the processor system is further programmed and adapted to: (iv) display a second image on the computer display screen, and (v) determine if a second user input indicating a portion of the second image corresponds to a second acceptable login user input. If desired, the processor system may allow user access to the computer system or network when the first and/or second user inputs correspond to the acceptable login user inputs.

Systems and methods according to at least some examples of this invention may accept user input (e.g., the first and/or second user inputs described above) as electronic ink input. For example, the various portions of the image may be "indicated" during the login procedure by drawing a predetermined shape at, near, or at least partially around the portion of the first image using electronic ink. Of course, various other aspects or characteristics of the input may be controlled, varied, and/or selected as part of the login procedure without departing from the invention. For example, ink color, ink thickness, pen tip shape, or other ink characteristics may be varied; characteristics of the input shape or shapes drawn by the user may be varied; the number of times a portion of an image is encircled may be controlled or varied; directional characteristics (e.g., line direction, pen movement direction, etc.) of the input may be varied; initial image selection to initiate the login procedure may be required (e.g., from a pallet of displayed image thumbnails); intermediate image selection to continue the login procedure may be required (e.g., from a pallet of displayed image thumbnails); the location(s) and/or number of "breaks" in an encirculation or other input characteristic may be varied; the pictographic login features may be used in combination with other login procedures or features, such as password entry, image selection; etc. Various other aspects of the input required during login may be varied, controlled, and used as part of the login security features without departing from this invention.

Still additional aspects of the invention relate to computer-readable media including computer-executable instructions stored thereon for providing image or pictographic based login procedures for computer systems or networks.

III. Example Hardware

FIG. 1 illustrates a schematic diagram of a general-purpose digital computing environment that may be used to implement various aspects of the present invention. In FIG. 1, a computer 100 includes a processing unit 110, a system memory 120, and a system bus 130 that couples various system components (including the system memory 120) to the processing unit 110. The system bus 130 may be any of several types of bus structures including a memory bus or memory controller, a peripheral bus, and a local bus using any of a variety of bus architectures. The system memory 120 may include read only memory ("ROM") 140 and random access memory ("RAM") 150.

A basic input/output system 160 ("BIOS"), which contains the basic routines that help to transfer information between elements within the computer 100 (such as during start-up), is stored in the ROM 140. The computer 100 also may include a hard disk drive 170 for reading from and writing to a hard disk (not shown), a magnetic disk drive 180 for reading from or writing to a removable magnetic disk 190, and/or an optical disk drive 191 for reading from or writing to a removable optical disk 199, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, BERNOULLI cartridges, random access memories, read only memories, and the like, also may be used in the example operating environment.

A number of program modules can be stored on the hard disk drive 170, magnetic disk 190, optical disk 199, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices may be connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input. Although a connection between the pen digitizer 165 and the serial port interface 106 is shown in FIG. 1, if desired, the pen digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically may include many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 may be connected to the local area network 112 through a network interface or adapter 114. When used in a WAN networking environment, the personal computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in a remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a client-server configuration to permit a user to retrieve web pages from a web-based server. Any of various conventional web browsers can be used to display and manipulate data on web pages.

Although the FIG. 1 environment shows one example environment, it will be understood that other computing environments also may be used in systems and methods according to this invention. For example, one or more examples of the present invention may use an environment having fewer than all of the various aspects shown in FIG. 1 and described above, and these aspects may appear in various combinations and subcombinations that will be apparent to one of ordinary skill. Additional features from those shown in FIG. 1 also may be included in environments useful with this invention.

Figure 2:
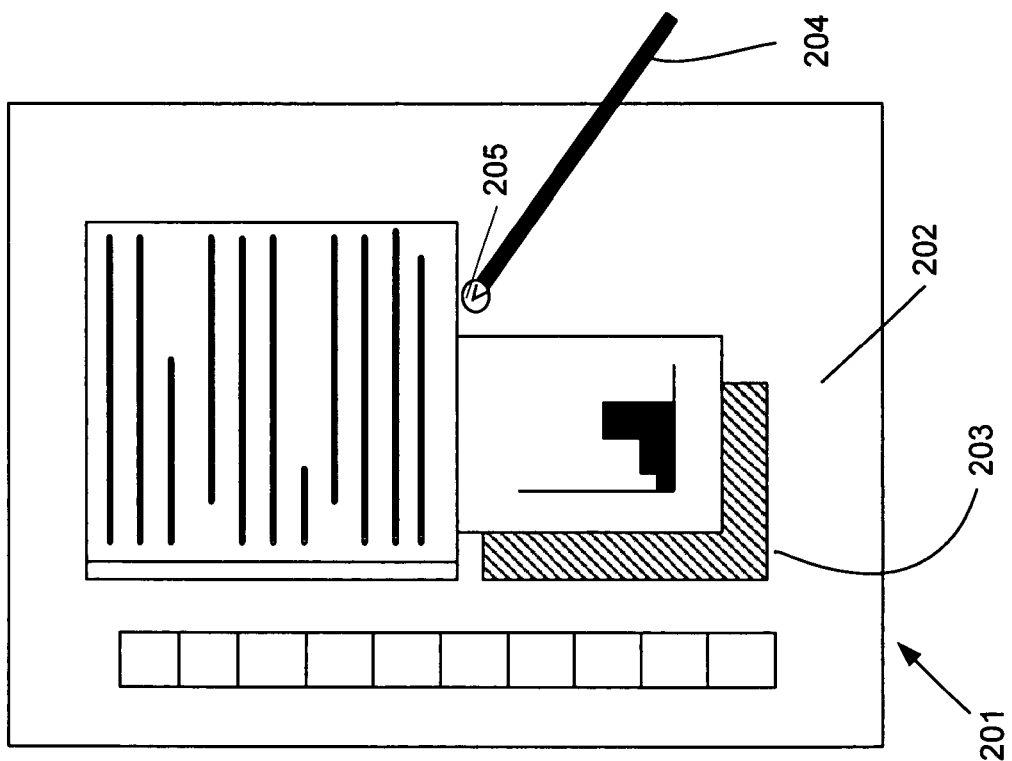
FIG. 2 illustrates an example pen-based personal computing environment in which at least some aspects of the present invention may be implemented.

FIG. 2 illustrates a pen-based personal computer ("PC") 201 that may be used in accordance with various aspects of the present invention. Any or all of the features, subsystems, and functions in the system of FIG. 1 can be included in the computer of FIG. 2. The pen-based personal computer system 201 includes a large display surface 202, e.g., a digitizing flat panel display, such as a liquid crystal display ("LCD") screen, on which a plurality of windows 203 is displayed. Using stylus 204, a user can select, highlight, and write on the digitizing display area and thereby enter electronic ink data into the system. Examples of suitable digitizing display panels include electromagnetic pen digitizers, such as pen digitizers available from Mutoh Co. (now known as FinePoint Innovations Co.) or Wacom Technology Co. Other types of pen digitizers, e.g., optical digitizers, also may be used. The pen-based computing system 201 interprets gestures made using stylus 204 in order to manipulate data, enter text as electronic ink, and execute conventional computer application tasks, such as creating, editing, and modifying spreadsheets, word processing programs, and the like.

The stylus 204 may be equipped with buttons or other features to augment its capabilities. In one example, a stylus 204 could be implemented as a "pencil" or "pen," in which one end constitutes a writing portion and the other end constitutes an "eraser" end 205, and which, when moved across the display, indicates portions of electronic ink on the display that are to be erased. Other types of input devices, such as a mouse, trackball, keyboard, or the like also may be used. Additionally, a user's own finger could be used as an input device, e.g., for selecting or indicating portions of the displayed image on a touch-sensitive or proximity-sensitive display. Consequently, the term "user input device," as used herein, is intended to have a broad definition and encompasses many variations on well-known input devices.

Recently, pen-based computing systems that accept user input via an electronic pen and/or display at least some forms of input as "electronic ink," e.g., of the type described above, have increased in popularity. Use of electronic ink input as opposed to conventional pen and paper is advantageous in many respects. For example, electronic ink input may be electronically stored, filed, and cataloged for future use, which enables it to be easily maintained, located, and shared with others. Additionally, because electronic ink input can be recognized and converted to conventional machine-generated text (e.g., text insertable into, readable by, and useful by conventional computers), it can be electronically stored, searched, and otherwise used on the computer, for example, in conventional word processing documents and programs, in spreadsheets, in email programs, in document management programs, in web browsers, and the like. Handwriting recognition systems are commercially available that allow handwritten electronic ink input to be converted to machine-generated text. One example of a handwriting recognizer is that provided with the Windows XP Tablet PC Edition™ operating system (available from Microsoft Corporation of Redmond, Wash.), although other handwriting recognizers also are known and may be used in computer systems in accordance with this invention.

In various examples, pen-based computer operating systems provide an ink platform through direct modification of GINA.dll or as a set of component object model ("COM") services that an operating system and/or an application program can use to capture, manipulate, recognize, and store ink and/or other pen actions or events. The ink platform also may include a mark-up language including a language like the extensible markup language ("XML"). Additional examples of the ink platform may use the distributed component object model ("DCOM") implementation. Yet further implementations may be used including the Win32 programming model and the .Net programming model from Microsoft Corporation. Such platforms are commercially available and known in the art. Electronic ink data may be stored in an ink serialized format ("ISF") or in any other suitable or desired manner, including in conventional manners known to those skilled in the art.

In addition to use with full performance pen-based computing systems or "tablet PCs" (e.g., convertible laptops or "slate" type tablet PCs), aspects of this invention may be used in conjunction with other types of pen-based computing systems and/or other devices that accept data as electronic ink and/or that accept, process, or display electronic pen or stylus input, such as: hand-held or palm-top computing systems; personal digital assistants; pocket personal computers; mobile and cellular telephones, pagers, and other communication devices; watches; appliances; and any other devices or systems that include monitors or other display devices and/or digitizers that present printed or graphical information to users and/or allow input using an electronic pen or stylus or that can process electronic ink collected by another device (e.g., a conventional desktop computer that can process electronic ink collected by a tablet PC).

Features of the invention now will be described in conjunction with the remaining figures, which illustrate various examples of the invention and/or contain information to help explain the invention. The specific figures and information contained in this detailed description should be construed as providing examples of the invention and not as limiting the invention.

IV. Example Systems, Methods, and Computer-Readable Media According to the Invention A. Examples of Environments and/or Input Situations that May Benefit from Implementation of Systems and Methods According to the Invention As described above, aspects of the present invention relate generally to systems and methods that may utilize an image in user authorization or authentication (e.g., secure website logins, computer system or network logins, and/or other security situations). A user may select a preferred image, for example from a menu of possible image choices or a personal image provided by the user, which is presented to the user on a display. The selected image, when displayed to the user, may be used in any authorization or authentication procedure in which the identity of the user needs to be ascertained. For example, when a user logs onto a computer system, it is typically desired that security of the system be maintained so that user data is not compromised by other users. Thus, methods and systems are desired that safeguard individual user accounts for the respective user.

The image selected conforms to predetermined characteristics and specifications to be optimized for use as a user authentication tool. The predetermined characteristics and specification of the selected image may be selected, for example, on the needs of the user in any given system or network and may include, but is not limited to, image complexity, size or resolution. For example, the image may contain a medium to high level of complexity such that a user may easily select a predetermined area in the image when a portion of the image is selected by the user for authentication. Also, increased complexity of the image increases accuracy of selection of the predetermined portion of the image, allowing the user to accurately pinpoint the portion of the image corresponding to the login selection. A complex image also is advantageous from a security standpoint in that it prevents or inhibits unauthorized users from easily guessing the portion of the image to be indicated for successful login or authentication.

Figure 3:
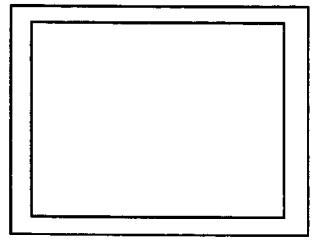
FIG. 3 illustrates an example of one aspect of the present invention in which an image is selected for use as an authentication tool.
Figure 3:
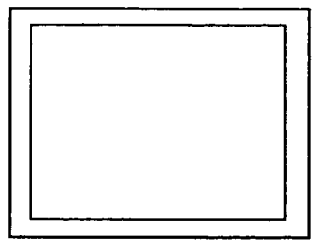
Figure 3:
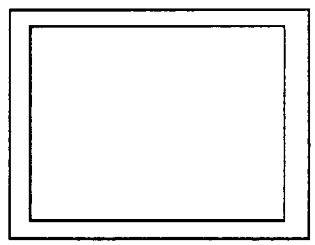
Figure 3:
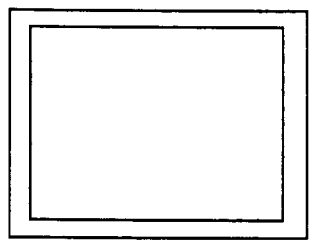
Figure 3:
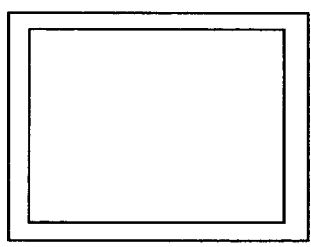
Figure 3:
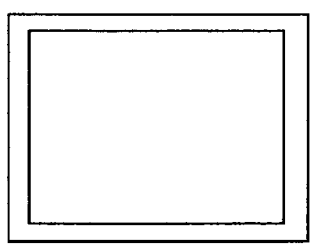
Figure 3:
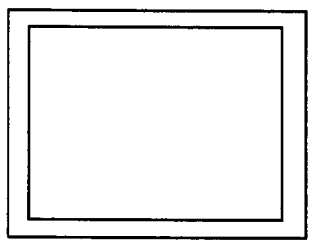
Figure 3:
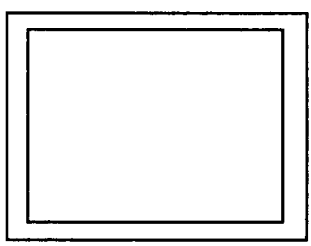
Figure 3:
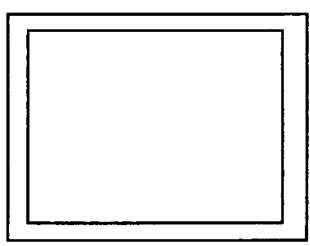
Figure 3:
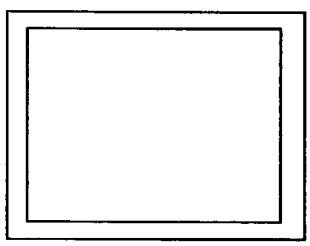
Figure 3:
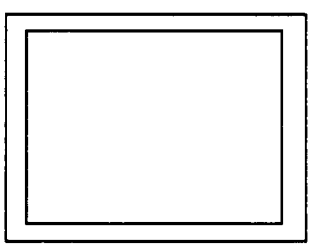
Figure 3:
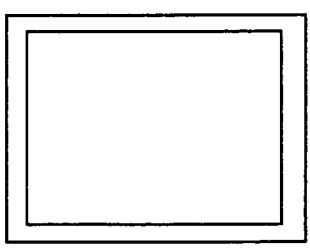
Figure 3:
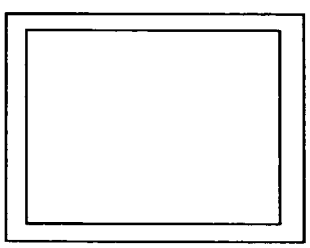
Figure 3:
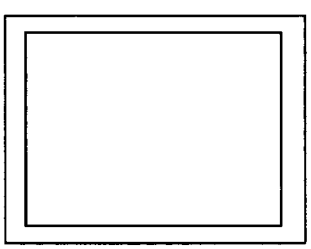
Figure 3:
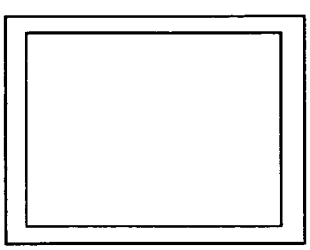

FIG. 3 illustrates an example of one aspect of the present invention in which an image is selected for use as an authentication tool. A selection of images is presented to a user on a display such that the user may select a desired image for use in the authentication procedure. Any number of images in any order or format may be used. For example, a display of multiple images may be presented on a display in a grid format (e.g., as thumbnail images) as illustrated in FIG. 3. As another potential option, a user could electronically page through a library of images (e.g., using a "NEXT" or "PREVIOUS" button) and select the authentication image from this library. Alternatively, a user may import his/her own image, if desired. However, for optimal performance, a user-provided image should conform to minimum resolution and complexity standards to ensure that the image provides a high level of security and privacy in the login process.

Figure 4B:
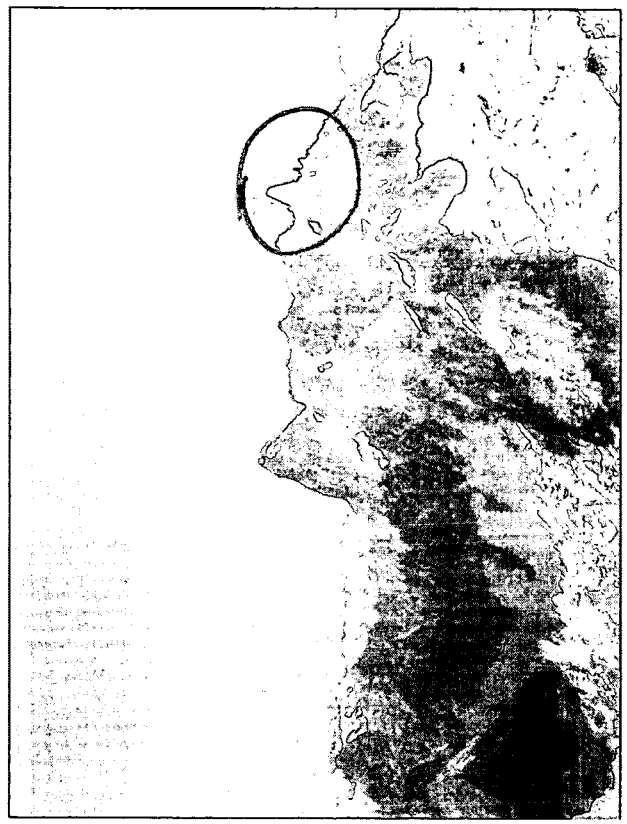
FIGS. 4A, 4B, and 4C illustrate an example of one aspect of the invention in which a user selects a portion of an image on a display in a user authentication procedure.
Figure 4A:
Figure 4C:
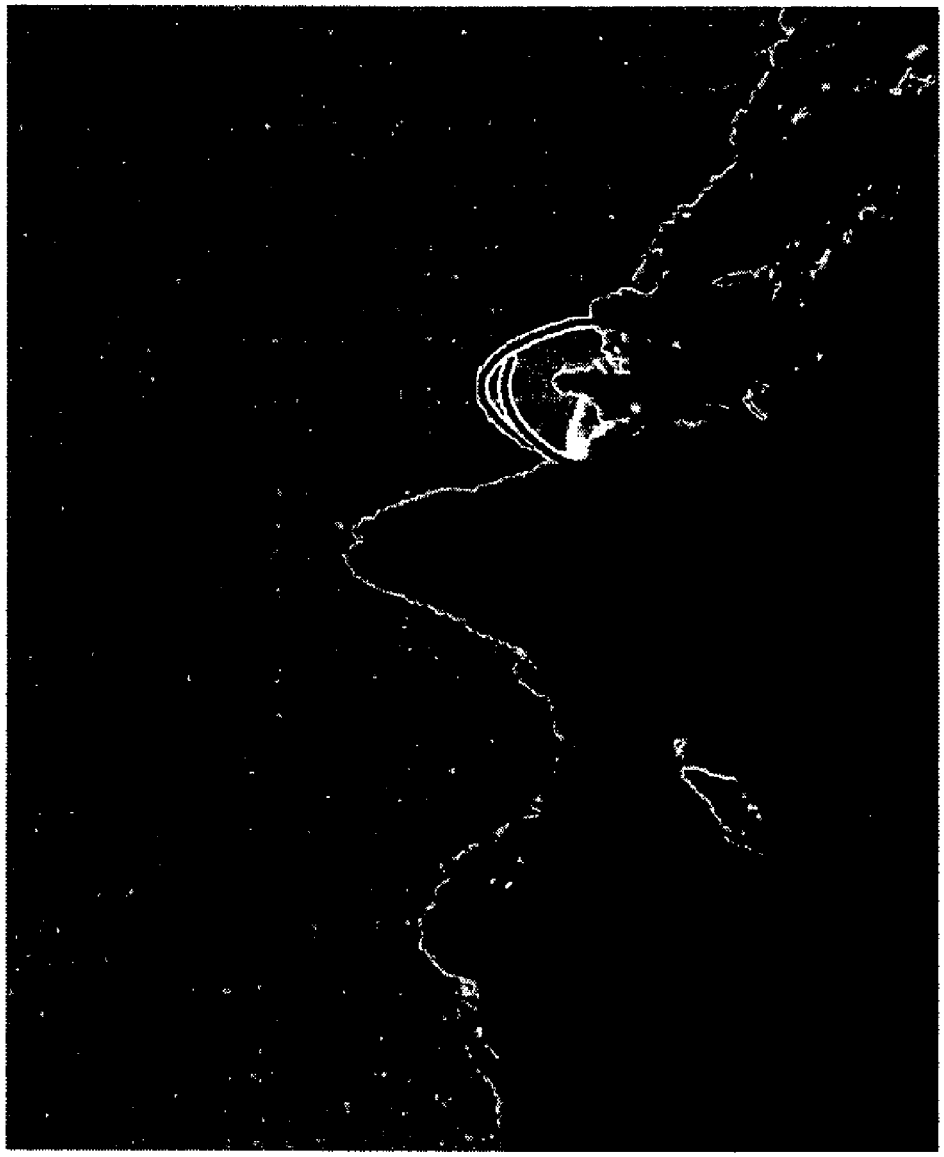

FIGS. 4A, 4B, and 4C illustrate an example of one aspect of the invention in which a user selects a portion of an image on a display in a first step of user authentication according to the present invention. FIG. 4A is an image previously selected by the user as a pictographic login image of the present invention, and when a procedure requiring user authentication is initiated (e.g., a computer is turned on, access to a secure website or data file is requested, etc.), this image is displayed to this user. The image has sufficient complexity and resolution to provide accuracy in selection of a portion of the image, reproducibility of selection of the proper portion of the image, and facility of the user to identify the desired portion of the image to select. As FIG. 4A illustrates, the image selected in this example is an image of snow-covered mountains.

FIG. 4B is the display of FIG. 4A after the user has selected a portion of the image for login or authentication purposes. User selection of a portion of the image may be accomplished by any variety of input devices such as but not limited to a mouse, a pen, a stylus, a finger, etc. For proper authentication, the user must select the area of the image that has been designated as the area of the image to select for successful log in. Thus, in this example, the area of the image to select for log-in has been previously selected by the user, and that same area of the image must be subsequently selected to successfully complete the log-in or authentication procedure. There are many other features of the selection of the image portion that may optionally be used to increase privacy and security. For example, the shape used to select the portion of the image may also be set to require user input in a certain shape such that the user must not only select the proper portion of the image, but he/she also must select the portion of the image using a predetermined shape. As will be shown, the predetermined shape used in the present example is a circle although the invention is not limited to any particular shape. Any shape may be used, and optionally required, for authentication, without departing from the invention.

Another potential method of enhancing security is to require preselected input characteristics relating to additional features of the image selection before authentication may be granted. For example, the direction of drawing the selection may be pre-selected such that the user may have to draw the image selection in a particular order or direction. In this example, the direction of selecting the proper portion of the image may be optionally limited to drawing the selection in a clockwise direction or in a counter-clockwise direction. As another example, the system may require user input of the selection to start at a particular spot on the circle (e.g., the 8 o'clock position) in order to successfully authenticate. In these ways, the user may be required to draw the selection in a predetermined manner or authentication may not occur. Also, the color of the electronic ink used for the selection may be optionally regulated in order to provide enhanced security. For example, the user may be required to draw the selection of the image with a particular color of ink, e.g., red, selected from a color pallet included with the authentication image. If this option is included in the authentication procedure, a user selecting the proper portion of the image may still fail to gain access or authorization if the user draws the selection with an improperly selected color. In this way, security is further increased such that an unauthorized person would have great difficulty in accessing the private account, data, or other information of another user.

To provide a high level of integrity of selection of the proper portion or area of the login image, the selection of the portion of the image by the user may not be the precise preselected area identified by the user during the security system set-up procedure. Due to variability and inaccuracies of the input by a human user, an authorized user may fail to draw a selection around the precise desired area in the image. Rather, due to human error or slight variations in selecting the proper portion of the image, the selection may be slightly skewed from the precise location of the portion of the image. The tolerance of the skew may depend on the individual system or network and may be calculated or adjusted based on the needs of the user, for example. Thus, the login and authentication method and system of the present invention provide for a tolerance in the selection of the portion of the image for user authorization. In this example, if the selection of the portion of the image for authorization is not precisely correct but is still within an allowable range from the originally designated selection area, the authorization process will proceed. Only if the selection is outside a predetermined tolerance level from the predetermined area will the system not permit the user to log in (or at least to continue into the login procedure). This tolerance may depend on many factors such as the complexity of the image, the resolution of the image used for authentication, or the input means, to name a few. Optionally, if desired, systems and methods according to at least some examples of this invention may allow a user and/or a system administrator to select the tolerance level to maximize security while permitting authentication within an acceptable range of the pre-selected input.

After the user properly selects the predetermined portion of the image for authentication as indicated in FIG. 4B, the system and method of the present invention proceeds with the authorization procedure. Proceeding with the authorization procedure may include any number of outcomes depending on the needs of the user or the parameters of the computer system. For example, after the user properly selects the portion of the image for authorization in the first step, the authorization procedure may proceed by completing the authorization process. In that case, the computer may complete other login procedures (e.g., open windows to secure information, launch programs designated in a start-up menu, etc.). Alternatively, after the user properly selects the portion of the image for authorization in the first step, the authorization procedure may proceed with other security and/or authentication steps that may be required by systems and methods according to at least some examples of this invention prior to full completion of authorization and login. As one more specific example, after a successful initial authentication procedure, another image may optionally be displayed as part of the authorization process. In this example as illustrated in FIG. 4C, an enlarged portion of the previous image is displayed on the screen. Alternatively, a different image altogether may be used. By including additional layers of image selection (or other authentication procedures), privacy and security are markedly increased such that unauthorized users may have great difficulty in accessing the account, system, and/or network.

As FIG. 4C illustrates, a second image is displayed after selection of the portion of the first image. In this example, the second image contains a portion that is further used for authentication of the user. For example, if the user properly selected the correct portion of the first image (as shown in FIG. 4B), the second image may appear, and proper selection by the user of a pre-selected portion in the second image enables continued authentication and/or login. For added security, a second image optionally still will be displayed even if the correct portion of the first image was not properly selected in the first step. In this way, an unauthorized user trying to compromise the system will not be tipped off as to whether the first selection was correct or erroneous immediately after the selection of a portion of the first image.

In FIG. 4C, the user selects a portion of the second image. As in the selection of the first image, there may be additional features to enhance security in selection of the portion of the second image including, but not limited to, specifying the color of the ink used to make the selection, restricting the manner or shape used in selecting the portion of the image, etc. If the user properly selects a pre-determined portion of the second image within an acceptable tolerance, the authentication process may continue.

If there are further images from which to select a portion from, the process repeats as described until the final image is properly processed and the proper portion of the final image is selected. If all of the selections were proper, the login and authentication process is complete and the user logs into the system under his Userid in his account. If any one selection was erroneous, login/authentication fails. A message may optionally be displayed to the user indicating that authorization has failed.

Also, for added security, traditional methods of authentication may be combined with the authentication methods of the present invention. For example, a traditional display in which a user is requested to input a userid and/or a password may be combined with the authentication method of the present invention to enhance security. In a traditional system in which only a userid and password is used, an unauthorized user may access the account if he/she is able to obtain the authorized user's password. By logging into the account improperly, the unauthorized user compromises security. However, in this example of the present invention in which authorization by image selection is combined by the traditional method(s) of authentication, multiple forms of security used in conjunction can further prevent an unauthorized user from improperly gaining access to another user's account information.

In another example of another aspect of the present invention, information may be hidden within the image displayed. There are many known method of hiding information within an image which may be incorporated in the present invention. For example, steganography may be used in which information is hidden in the image such that only the user knows of the existence of the information. For example, key information of, but not limited to, the form (login name plus the key data) and hashed in one selection may be hidden steganographically into an image. As the user selects the proper portion of each consecutive image, the hidden information, such as the key code or login name, is selected. If a match occurs at the completion of the authorization process between the stored information (e.g., key or login name) and the steganographically hidden information selected by the user, login is successful.

As referred to above, there are many potential features that may be included and/or varied in the authentication of the present invention. Some of these variations include:

Ink color (or other characteristics, such as thickness); shape(s) drawn; number of "encirculations;" directional characteristics (e.g., line direction, pen movement direction, etc.); position with respect to image (which may move from login to login); absolute position on the digitizer irrespective of image position; initial image selection by user; intermediate image selection by user; location(s) or number of "breaks" in an encirculation; use encirculation login in combination with other login procedures, such as password entry, image selection, etc.;

Finally, the present invention also relates to computer-readable media including computer-executable instructions stored thereon for performing various methods and operating various systems, including the systems and/or methods described above. The computer-readable media may constitute computer-executable instructions stored on the various specific examples of computer-readable media described above.

V. Conclusion

Various examples of the present invention have been described above, and it will be understood by those of ordinary skill that the present invention includes within its scope all combinations and subcombinations of these examples. Additionally, those skilled in the art will recognize that the above examples simply exemplify various aspects of the invention. The various specific steps and/or architectural elements described above can be changed, functions may be added, deleted, combined, and/or changed in order without departing from the invention. Thus, various changes and modifications may be made without departing from the spirit and scope of the invention, as defined in the appended claims.

The invention claimed is:

1. A user authentication method, comprising acts of:
   displaying a first image on a display screen;
   receiving a first user input comprising a first shape that is drawn around a portion of the displayed first image;
   performing a first authentication step comprising verifying that the portion of the displayed first image around which the first shape is drawn, matches a designated portion of the first image that is predetermined for user authentication;
   displaying a second image on the display screen, wherein displaying of the second image provides no indication of a result of the first authentication step;
   receiving a second user input comprising a second shape that is drawn around a portion of the displayed second image;
   performing a second authentication step comprising verifying that the portion of the displayed second image around which the second shape is drawn, matches a designated portion of the second image that is predetermined for user authentication; and
   determining that a user is successfully authenticated upon successful completion of the first and second authentication steps;
   wherein at least one of the first or second authentication steps further comprising:
      verifying that the respective first or second shape matches a predetermined shape, and
      verifying that a direction in which the respective first or second shape is drawn matches a predetermined direction.

2. The method according to claim 1, further comprising an act of:
   allowing the user to access a computer system when the user is determined to be successfully authenticated.

3. The method according to claim 1, wherein the second image is an enlargement of a part of the first image.

4. The method according to claim 1, wherein at least one of the first or the second user inputs include electronic ink input.

5. The method according to claim 1, wherein at least one of the first or second authentication steps further comprising verifying that a color used to draw the respective first or second shape matches a predetermined color.

6. The method according to claim 1, wherein at least one of the first or second authentication steps further comprising verifying that the respective first or second shape is drawn by starting at a predetermined spot of the predetermined shape.

7. A computer-readable storage medium including computer-executable instructions stored thereon for performing steps of:
   displaying a first image on a display screen;
   receiving a first user input comprising a first shape that is drawn around a portion of the displayed first image;
   performing a first authentication step comprising verifying that the portion of the displayed first image around which the first shape is drawn, matches a designated portion of the first image that is predetermined for user authentication;
   displaying a second image on the display screen, wherein displaying of the second image provides no indication of a result of the first authentication step;
   receiving a second user input comprising a second shape that is drawn around a portion of the displayed second image;
   performing a second authentication step comprising verifying that the portion of the displayed second image around which the second shape is drawn, matches a designated portion of the second image that is predetermined for user authentication; and
   determining that a user is successfully authenticated upon successful completion of the first and second authentication steps;
   wherein at least one of the first or second authentication steps further comprising:
      verifying that the respective first or second shape matches a predetermined shape, and
      verifying that the direction in which the respective first or second shape is drawn matches a predetermined direction.

8. A system, comprising:
   a display screen;
   an input system for receiving user input; and
   a processor system programmed to:
      display a first image on the display screen in response to a first user's initiation of a procedure requiring authentication of the first user as an authorized user, wherein the first image comprises a designated portion of the first image that was previously selected by the authorized user as a portion of the first image that must be properly selected when the first image is displayed to the first user for user authentication;
      receive a first user input via the input system, wherein the first user input indicates a user-selected portion of the displayed first image,
      wherein the first user input comprises a shape that is drawn at least partially around the user-selected portion of the displayed first image; and
      determine that the first user input constitutes a proper selection of the designated portion of the first image for user authentication, when the first user input satisfies pre-specified conditions for proper selection of the designated portion of the first image;
      wherein the pre-specified conditions include:
         a first condition that the user-selected portion of the displayed first image corresponds to the designated portion of the first image at least within a permitted level of variation between the user-selected portion of the displayed first image and the designated portion of the first image,
         a second condition that the shape that is drawn at least partially around the user-selected portion of the displayed first image matches a predetermined shape, and
         a third condition that the shape that is drawn at least partially around the user-selected portion of the displayed first image is drawn by starting at a predetermined spot of the predetermined shape.

9. The system according to claim 8, wherein the processor system is further programmed to:
   display a second image on the display screen, wherein displaying the second image provides no indication of an improper selection of the designated portion of the first image, and further wherein the second image comprises a designated portion of the second image that was previously selected by the authorized user as a portion of the second image that must be properly selected when the second image is displayed to the first user for user authentication, and
   receive a second user input via the input system, wherein the second user input indicates a user-selected portion of the displayed second image, and determine if the second user input constitutes a proper selection of the designated portion of the second image for user authentication.

10. The system according to claim 9, wherein when the second user input is determined to be a proper selection of the designated portion of the second image for user authentication, the processor system is further programmed to allow the first user to access a computer system.

11. The system according to claim 9, wherein the second image is an enlargement of a part of the first image.

12. The system according to claim 9, wherein the second user input includes electronic ink input comprising a shape that is drawn at least partially around the user-selected portion of the displayed second image.

13. The system according to claim 12, wherein the shape that is drawn at least partially around the user-selected portion of the displayed second image comprises a predetermined shape that is drawn as a condition for proper selection of the designated portion of the second image.

14. The system according to claim 8, wherein the processor system is further programmed to allow the first user to access a computer system.

* * * * *